United States Patent
Yue et al.

(10) Patent No.: US 11,244,607 B2
(45) Date of Patent: Feb. 8, 2022

(54) PROTECTION CIRCUIT FOR PROTECTING LIGHT EMITTING ELEMENT, METHOD FOR DRIVING THE PROTECTION CIRCUIT, PIXEL UNIT AND DISPLAY PANEL

(71) Applicant: BOE TECHNOLOGY GROUP CO., LTD., Beijing (CN)

(72) Inventors: Han Yue, Beijing (CN); Hsuanwei Mai, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/850,323

(22) Filed: Apr. 16, 2020

(65) Prior Publication Data
US 2021/0090496 A1 Mar. 25, 2021

(30) Foreign Application Priority Data
Sep. 24, 2019 (CN) .......................... 201910904028.0

(51) Int. Cl.
*G09G 3/3225* (2016.01)
*H02H 9/04* (2006.01)

(52) U.S. Cl.
CPC ............. *G09G 3/3225* (2013.01); *H02H 9/04* (2013.01); *G09G 2320/04* (2013.01)

(58) Field of Classification Search
CPC ....... G09G 3/3225; G09G 2330/00–12; H02H 9/04
See application file for complete search history.

(56) References Cited

U.S. PATENT DOCUMENTS

| | | | |
|---|---|---|---|
| 2005/0285116 A1* | 12/2005 | Wang | H01L 24/11 257/76 |
| 2018/0374991 A1* | 12/2018 | Bour | H01L 33/145 |
| 2019/0189681 A1* | 6/2019 | Chae | G09G 3/3225 |

* cited by examiner

*Primary Examiner* — Hang Lin
(74) *Attorney, Agent, or Firm* — Nath, Goldberg & Meyer; Joshua B. Goldberg

(57) ABSTRACT

The present disclosure provides a protection circuit for protecting a light emitting element, a pixel unit including the protection circuit, a display panel, and a driving method of the protection circuit. The protection circuit for protecting the light emitting element includes: a bonding protection sub-circuit including a sacrificial metal region, configured to electrically couple the sacrificial metal region to an anode pad and a cathode pad on the backplane for bonding the light emitting element during a period of bonding the light emitting element to the backplane.

15 Claims, 7 Drawing Sheets

PROTECTION CIRCUIT FOR PROTECTING LIGHT EMITTING ELEMENT, METHOD FOR DRIVING THE PROTECTION CIRCUIT, PIXEL UNIT AND DISPLAY PANEL

CROSS-REFERENCE TO RELATED APPLICATIONS

The present disclosure claims priority to Chinese patent publication No. 201910904028.0, filed on Sep. 24, 2019, the contents of which are incorporated herein by reference.

TECHNICAL FIELD

The present disclosure relates to the field of display technology, and particularly, to a protection circuit for protecting a light emitting element, a method for driving the protection circuit, a pixel unit including the protection circuit, and a display panel including the pixel unit.

BACKGROUND

Display panels including light emitting elements such as micro light emitting diodes (micro LEDs) have advantages of lightness, thinness, fast response, wide viewing angle, low power consumption, rich colors and so on, and have been increasingly used for image display.

SUMMARY

An embodiment of the disclosure provides a protection circuit for protecting a light emitting element, including: a bonding protection sub-circuit including a sacrificial metal region, the bonding protection sub-circuit being configured to electrically couple the sacrificial metal region to an anode pad and a cathode pad on a backplane for bonding the light emitting element during a period of bonding the light emitting element to the backplane.

In some implementations, the protection circuit further including: an electrostatic protection sub-circuit configured to, in a light emission period of the light emitting element, cause an anode of the light emitting element to be electrically coupled to a first voltage terminal supplying a first voltage, in response to an anode voltage of the anode of the light emitting element being less than a cathode voltage of a cathode of the light emitting element and an absolute value of a difference between the anode voltage and the cathode voltage being equal to a reverse breakdown threshold voltage of the light emitting element.

In some implementations, the electrostatic protection sub-circuit includes: a first switch element having a control terminal electrically coupled to a second voltage terminal for providing a second voltage, a first terminal electrically coupled to the anode of the light emitting element, and a second terminal electrically coupled to the first voltage terminal.

In some implementations, in the light emission period, the second voltage is equal to or greater than a first threshold voltage and equal to or less than a second threshold voltage, the first threshold voltage is determined according to the following expression:

$$V_{T1}=V_{ss}-V_{BR}+V_{th}$$

wherein $V_{T1}$ represents the first threshold voltage, $V_{ss}$ represents the cathode voltage of the light emitting element, $V_{BR}$ represents a reverse breakdown threshold voltage of the light emitting element, and $V_{th}$ represents a turn-on threshold voltage of the first switching element; and the second threshold voltage is determined according to the following expression:

$$V_{T2}=V_{min}+V_{th}$$

wherein $V_{T2}$ represents the second threshold voltage, $V_{min}$ represents a minimum value of the anode voltage when the light emitting element normally emits light, and $V_{th}$ represents the turn-on threshold voltage of the first switching element.

In some implementations, the sacrificial metal region is electrically coupled to the cathode pad, and the sacrificial metal forming the sacrificial metal region has a greater electron-loss capability than the metal forming the anode pad and the cathode pad.

In some implementations, the bonding protection sub-circuit further includes a second switching element having a control terminal electrically coupled to a third voltage terminal for providing a third voltage, a first terminal electrically coupled to the anode pad, and a second terminal electrically coupled to the cathode pad.

In some implementations, the first switching element includes an N-type transistor and the second switching element includes an N-type transistor.

An embodiment of the present disclosure provides a pixel unit, including: the protection circuit described above; a light emitting element; and a pixel driving circuit configured to control a magnitude of a current flowing through the light emitting element based on an input data signal to control a light emission luminance of the light emitting element.

An embodiment of the present disclosure provides a display panel, including a plurality of pixel units described above.

An embodiment of the present disclosure provides a driving method for driving the protection circuit described above, including: in a first period, electrically coupling, using the bonding protection sub-circuit, the sacrificial metal region to the anode pad and the cathode pad on the backplane for bonding the light emitting element.

In some implementations, the driving method further including: in a second period, in response to an anode voltage of an anode of the light emitting element being less than a cathode voltage of a cathode of the light emitting element and an absolute value of a difference between the anode voltage and the cathode voltage being equal to a reverse breakdown threshold voltage of the light emitting element, electrically coupling the anode of the light emitting element to a first voltage terminal for providing a first voltage.

In some implementations, the protection circuit including a first switch element having a control terminal electrically coupled to a second voltage terminal for providing a second voltage, a first terminal electrically coupled to the anode of the light emitting element, and a second terminal electrically coupled to the first voltage terminal, wherein the driving method further including: in the second period, setting the second voltage to be equal to or greater than a first threshold voltage and equal to or less than a second threshold voltage, and setting the first voltage to be equal to or greater than the second voltage.

In some implementations, the first threshold voltage is determined according to the following expression:

$$V_{T1}=V_{ss}-V_{BR}+V_{th}$$

wherein $V_{T1}$ represents the first threshold voltage, $V_{ss}$ represents the cathode voltage of the light emitting element, $V_{BR}$ represents a reverse breakdown threshold voltage of the light emitting element, and $V_{th}$ represents a turn-on threshold voltage of the first switching element; and the second threshold voltage is determined according to the expression:

$$V_{T2}=V_{min}+V_{th}$$

wherein $V_{T2}$ represents the second threshold voltage, $V_{min}$ represents a minimum value of the anode voltage when the light emitting element normally emits light, and $V_{th}$ represents the turn-on threshold voltage of the first switching element.

In some implementations, the bonding protection sub-circuit further includes a second switching element having a control terminal electrically coupled to a third voltage terminal for providing a third voltage, a first terminal electrically coupled to the anode pad, and a second terminal electrically coupled to the cathode pad, wherein the method further including: in the first period, turning on the second switching element by the third voltage.

In some implementations, the driving method further including: after the first period, turning off the second switching element by the third voltage.

In some implementations, the protection circuit includes a first switch element having a control terminal electrically coupled to a second voltage terminal for providing a second voltage, a first terminal electrically coupled to the anode of the light emitting element, and a second terminal electrically coupled to the first voltage terminal, and the bonding protection sub-circuit further includes a second switching element having a control terminal electrically coupled to a third voltage terminal for providing a third voltage, a first terminal electrically coupled to the anode pad, and a second terminal electrically coupled to the cathode pad, wherein the driving method further including: in a third period, turning off the second switching element by the third voltage, turning on the first switching element by the second voltage, and causing the light emitting element to emit light by the first voltage to test the light emitting element.

DESCRIPTION OF DRAWINGS

The above and other features and advantages of the embodiments of the present disclosure will become more apparent from the following description of the embodiments of the present disclosure taken in conjunction with the accompanying drawings. It should be noted that throughout the drawings, like elements are represented by like or similar reference numerals. In the drawings.

DESCRIPTION OF EMBODIMENTS

Figure 1:
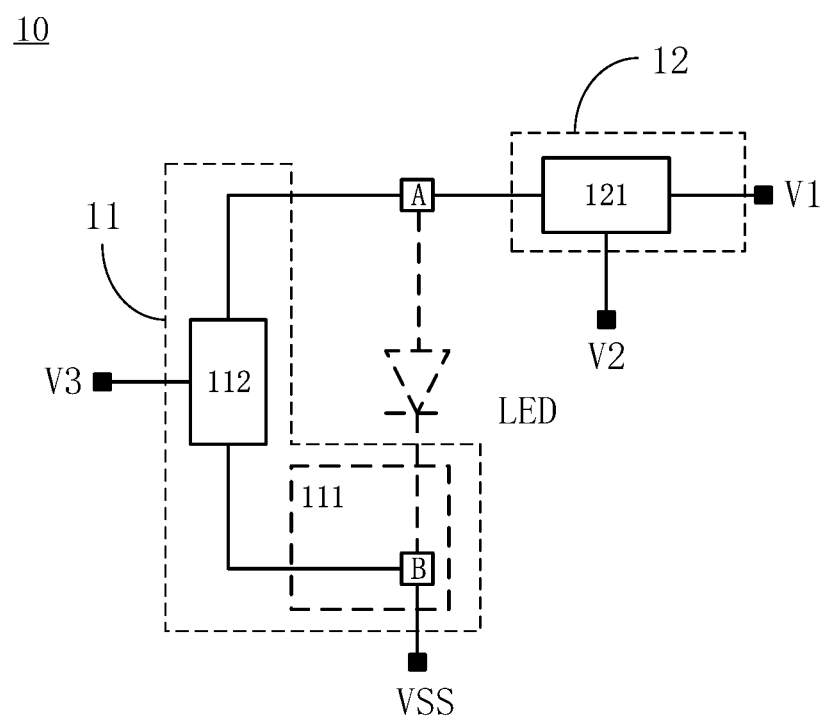
FIG. 1 schematically illustrates a protection circuit for protecting a light emitting element according to an embodiment of the present disclosure.

In order to make technical solutions and advantages of embodiments of the present disclosure more clear, the technical solutions of the embodiments of the present disclosure will be clearly and completely described below with reference to the drawings in the embodiments of the present disclosure. It should be understood that the described embodiments are only a portion of, but not all of embodiments of the present disclosure. All other embodiments, which may be derived by a person skilled in the art from the described embodiments of the disclosure without creative effort, are within the protection scope of the disclosure. In the following description, some specific embodiments are for illustrative purposes only and should not be construed as limiting the disclosure in any way, but merely as exemplifications of embodiments of the disclosure. Conventional structures or constructions will be omitted when they may obscure the understanding of the present disclosure. It should be noted that shapes and sizes of the respective components in the drawings do not reflect actual sizes and proportions, but merely illustrate the contents of the embodiments of the present disclosure.

Unless defined otherwise, technical or scientific terms used in the embodiments of the present disclosure should be given their ordinary meanings as understood by those skilled in the art. The use of "first," "second," and the like in the embodiments of the present disclosure is not intended to indicate any order, quantity, or importance, but rather is used to distinguish one element from another.

In addition, in the description of the embodiments of the present disclosure, the term "connecting", "coupling" or their variants may mean that two components are directly coupled, or two components are coupled via one or more other components. Further, the two components may be connected or coupled by a wire or wirelessly.

The transistors employed in the embodiments of the present disclosure may include switching transistors or driving transistors according to functions thereof. The switching transistors and the driving transistors may be thin film transistors, field effect transistors or other devices having the same characteristics.

In the embodiment of the present disclosure, a source and a drain of a transistor are symmetrical, so the source and the drain can be interchanged. In the embodiments of the present disclosure, a gate is referred to as a control terminal according to functions thereof, one of the source and the drain is referred to as a first terminal, and the other of the source and the drain is referred to as a second terminal.

Further, in the description of the embodiments of the present disclosure, the terms "first level" and "second level" are used only to distinguish different magnitudes of the two levels. For example, the description is made below by taking the "first level" as a relatively high level and the "second level" as a relatively low level as an example. Those skilled in the art will appreciate that the present disclosure is not limited hereto.

In addition, the light emitting elements in the embodiments herein are all exemplified by inorganic light emitting diodes (LEDs), wherein the inorganic light emitting diodes may be micro light emitting diodes (micro LEDs), that is, the inorganic light emitting diodes may include micro light emitting diodes each of which having a size below 50 μm and mini light emitting diodes each of which having a size ranging from 50 μm to 150 μm. It will be appreciated by those skilled in the art that the embodiments may also be used for other light emitting elements, such as OLEDs (Organic Light Emitting Diodes).

Conventional display panels suffer from various process drawbacks. For example, in a process of bonding a light emitting element, such as a micro LED, to a backplane of a display panel, reflow soldering or eutectic soldering, requiring a high temperature, is generally employed. Pads on the backplane are typically made of copper (Cu) material. Copper is a metal that is easily oxidized, and is more easily oxidized under the high temperature of the bonding process. The oxide layer formed after the copper is oxidized will adhere to the surface of the pad and form a contact resistance. Therefore, when the micro LED is bonded to the backplane, the micro LED is not easily electrically coupled to the backplane, so that the light emitting effect of the micro LED is affected, and even the micro LED cannot be electrically coupled to the backplane and thus cannot emit light in normal. In addition, since the light emitting element such as a micro LED is an electrostatic sensitive device, while operating, static electricity is easily accumulated thereon, thereby causing the display panel to fail to sufficiently exert its performance.

FIG. 1 schematically illustrates a protection circuit for protecting a light emitting element according to an embodiment of the present disclosure. In FIG. 1, the light emitting element is illustrated as a micro LED, and is illustrated by a dotted line since the light emitting element is not included in the protection circuit 10. As shown in FIG. 1, the protection circuit 10 for protecting the light emitting element according to the embodiment of the present disclosure may include a bonding protection sub-circuit 11 and an electrostatic protection sub-circuit 12. According to the embodiment of the present disclosure, the bonding protection sub-circuit 11 may include a sacrificial metal region 111, and may be configured to electrically couple the sacrificial metal region 111 to an anode pad and a cathode pad on the backplane for bonding the light emitting element during a period of bonding the light emitting element to the backplane. According to the embodiment of the present disclosure, the electrostatic protection sub-circuit 12 may be configured to electrically couple the anode of the light emitting element with a first voltage terminal V1 supplying a first voltage during a period of the light emitting element emitting light, in response to an anode voltage of the anode of the light emitting element being less than a cathode voltage of the cathode of the light emitting element and an absolute value of a difference between the anode voltage and the cathode voltage being equal to a reverse breakdown threshold voltage of the light emitting element. The case where the protection circuit includes both the bonding protection sub-circuit 11 and the electrostatic protection sub-circuit 12 is shown in this embodiment, but it should be understood that the protection circuit may include only one of the bonding protection sub-circuit 11 and the electrostatic protection sub-circuit 12.

In some implementations, the bonding protection sub-circuit 11 may include the sacrificial metal region 111 and a second switching element 112.

As shown in FIG. 1, the sacrificial metal region 111 is electrically coupled to a cathode pad B on the backplane for bonding the micro LED. The sacrificial metal region 111 may be formed of a sacrificial metal. The sacrificial metal may be oxidized prior to the pad metal during the period of bonding the micro LED to the backplane, thereby providing an additional oxidized region to protect the pad. According to the embodiment of the present disclosure, the electron losing ability of the sacrificial metal forming the sacrificial metal region 111 may be greater than that of the pad metal forming the anode pad A and the cathode pad B, so that the sacrificial metal may be oxidized prior to the pad metal. In FIG. 1, the sacrificial metal region 111 is shown by a dotted rectangular region connected to the cathode pad B, and in practice, the sacrificial metal region 111 may be a layer of sacrificial metal material deposited in a semiconductor device.

As further shown in FIG. 1, a control terminal of the second switching element 112 is electrically coupled to a third voltage terminal V3 for providing a third voltage, a first terminal of the second switching element 112 is electrically coupled to the anode pad A of the backplane for coupling to the anode of the micro LED, and a second terminal of the second switch element 112 is electrically coupled to a cathode pad B of the backplane for coupling to the cathode of the micro LED. The second switching element 112 is controlled to be turned on or off by the third voltage, thereby controlling coupling or decoupling between the sacrificial metal region 111 and the anode pad A.

The following description will be made by taking an example in which the switching transistor is an N-type thin film transistor. It will be appreciated by those skilled in the art that the switching transistor may also be a P-type thin film transistor, it only needs to change the polarity of the signal applied to the control terminal of the transistor accordingly.

Figure 2:
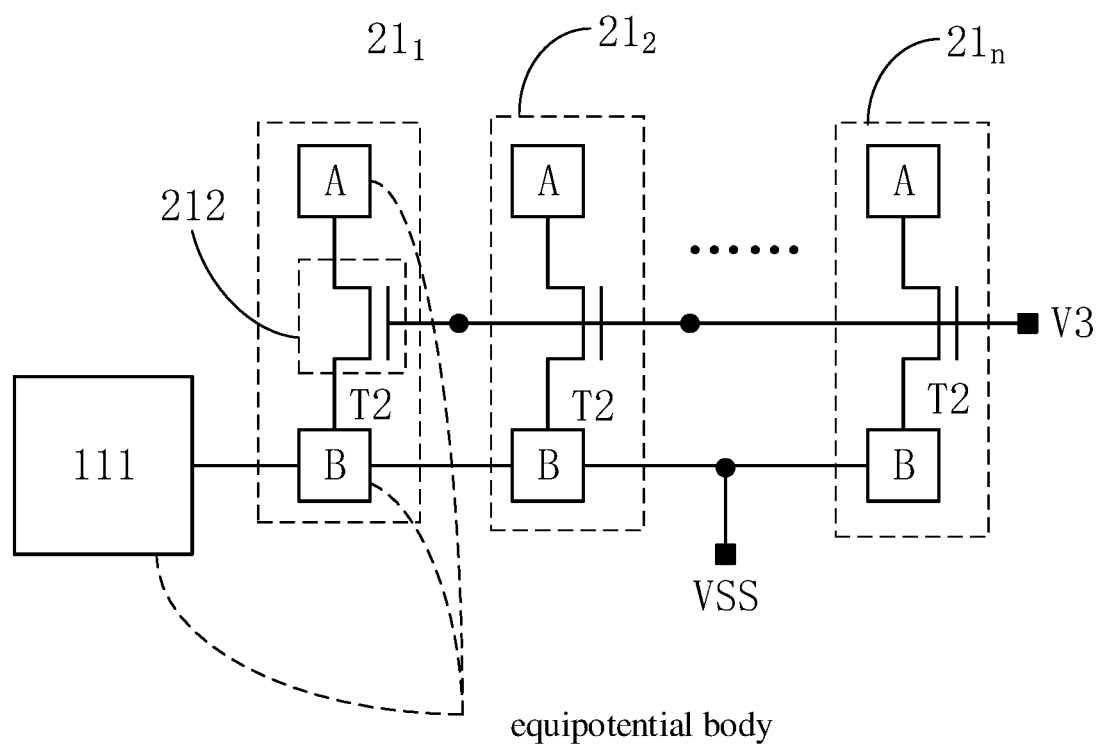
FIG. 2 schematically illustrates example operations of a bonding protection sub-circuit according to embodiments of the disclosure.

FIG. 2 schematically illustrates an example operation of a bonding protection sub-circuit according to an embodiment of the disclosure. To facilitate understanding, FIG. 2 schematically illustrates a plurality of bonding protection sub-circuits $21_1$, $21_2$, . . . , $21_n$ in a display panel according to an embodiment of the present disclosure. In each of the bonding protection sub-circuits, the second switching element 212 may be implemented as a transistor T2. As shown in FIG. 2, the gate of the transistor T2 is electrically coupled to the third voltage terminal V3, the drain of the transistor T2 is electrically coupled to the anode pad A, and the source of the transistor T2 is electrically coupled to the cathode pad B. As shown in FIG. 2, the gates of the plurality of transistors T2 in the display panel may be electrically coupled to a single third voltage terminal V3, and the cathode pads B corresponding to the plurality of light emitting elements, respectively, are all electrically coupled to a common voltage terminal VSS. Before performing the bonding of the micro LED to the backplane, the third voltage at a first level (e.g., a high level) is applied to the gate of the transistor T2 via the third voltage terminal V3. Since a common voltage $V_{SS}$ of the common voltage terminal VSS may be at a second level (e.g., a low level), the transistor T2 is turned on. Since the transistor T2 is turned on, the anode pad A and the cathode pad B on the backplane for bonding the micro LED are both electrically coupled to the common voltage terminal VSS. Since the sacrificial metal region 111 is electrically coupled to the cathode pad B, the sacrificial metal region 111, the anode pad A, and the cathode pad B may all be electrically coupled to the common voltage terminal VSS due to the transistor T2 being turned on. Further, for a micro LED display panel formed of a plurality of micro LEDs, after the transistor T2 is turned on, all of the sacrificial metal regions 111, the anode pads A and the cathode pads B may be electrically coupled to the common voltage terminal VSS, thereby forming an equipotential body.

According to the foregoing embodiment, the sacrificial metal forming the sacrificial metal region 111 is made of a material having an electron losing capability higher than that of the pad metal, and thus, the sacrificial metal is more easily oxidized than the pad metal when the micro LED is bonded to the backplane through a high temperature process (e.g., reflow soldering or eutectic soldering). Meanwhile, since the sacrificial metal region 111, the anode pad A and the cathode pad B form an equipotential body together, after the sacrificial metal is preferentially oxidized due to the higher electron losing capability, the pad metal supplements electrons to the region where the sacrificial metal is located, an oxide is mainly formed in the region where the sacrificial metal is located, and the oxide is relieved or prevented from being formed at the pads, so that the pads are protected.

With continued reference to FIG. 2, after the bonding operation of the micro LED to the backplane is completed, the third voltage at a low level is applied to the gate of the transistor T2 through the third voltage terminal V3, so that the transistor T2 is turned off. At this time, the coupling of the anode pad A and the cathode pad B with the sacrificial metal region 111 is decoupled, so that the bonded micro LED can emit light according to other driving control signals of the driving circuit.

The sacrificial metal is selected based on the principle that the electron losing capability of the sacrificial metal is higher than that of the pad metal. In some implementations, compared to pads made of metallic copper, magnesium (Mg), zinc (Zn), or alloys thereof may be selected as the sacrificial metal. Other metals may also be selected, and the embodiments of the present disclosure are not limited thereto.

In addition, it should be noted that the sacrificial metal region 111 and the transistor T2 (the second switching element 112) may be fabricated on the backplane before the micro LED is bonded to the backplane. After the micro LED is bonded to the backplane, the anode of the micro LED is electrically coupled to the anode pad A, and the cathode of the micro LED is electrically coupled to the cathode pad. Therefore, in the drawings, the anode pad A and the anode of the micro LED are shown at a same place and are not particularly distinguished, and the cathode pad B and the cathode of the micro LED are shown at a same place, and are not particularly distinguished.

According to an embodiment of the disclosure, during the period of bonding the micro LED to the backplane, additional oxidation regions are provided for the anode pad and the cathode pad for bonding the micro LED on the backplane, so that oxidization of the pads are relieved or avoided, the coupling between the micro LED and the backplane is improved, and the display performance is improved.

The micro LED is an electrostatic sensitive device, while operating, static electricity is easily accumulated thereon, the display effect is influenced, and in severe cases, static breakdown may be caused to damage the micro LED display panel. For example, when charges are accumulated at the anode of the micro LED due to an electrostatic effect, the anode voltage of the micro LED is caused to be decreased, thereby affecting the magnitude of current flowing through the micro LED, so that the micro LED cannot emit light according to a predetermined display scheme. When the charges are further accumulated so that the cathode voltage of the micro LED is higher than the anode voltage, and a difference between the cathode voltage and the anode voltage reaches the reverse breakdown threshold voltage of the micro LED, electrostatic breakdown is induced to damage the micro LED.

According to the embodiment of the present disclosure, as shown in FIG. 1, the electrostatic protection sub-circuit 12 may include a first switching element 121, a control terminal of the first switching element 121 is electrically coupled to a second voltage terminal V2 for providing a second voltage, a first terminal of the first switching element 121 is electrically coupled to the anode of the micro LED, and a second terminal of the first switching element 121 is electrically coupled to a first voltage terminal V1 for providing a first voltage. By controlling the value of the second voltage applied to the control terminal of the first switching element 121 via the second voltage terminal V2 and controlling the value of the first voltage applied to the second terminal of the first switching element 121 via the first voltage terminal V1, the first switching element 121 may be turned on to eliminate accumulated charges when the electrostatic accumulation of the anode of the micro LED reaches a critical state, i.e., electrostatic breakdown is about to occur, and turned off after the accumulated charges are eliminated without affecting the light emission of the micro LED, i.e., automatic feedback of the accumulated charges is achieved via the first switching element 121. A specific operation example of the electrostatic protection sub-circuit 12 will be described below. As described above, in this example, the first switching element 121 is described as an N-type thin film transistor.

Figure 3A:
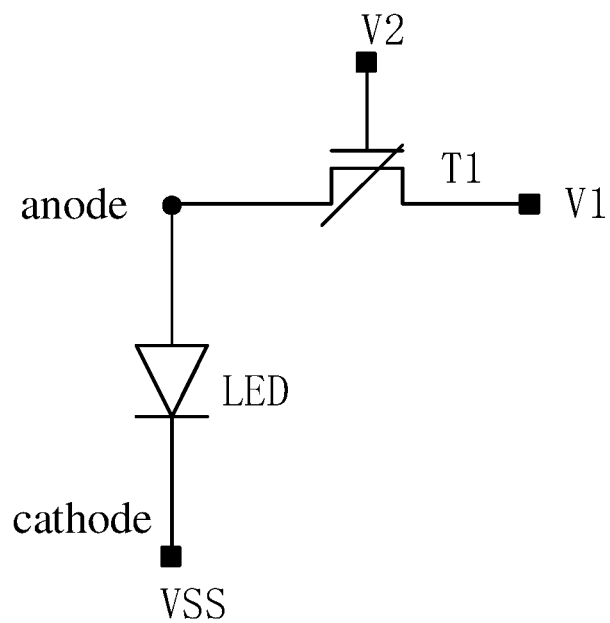
FIGS. 3A and 3B schematically illustrate example operations of an electrostatic protection sub-circuit according to embodiments of the present disclosure.
Figure 3B:
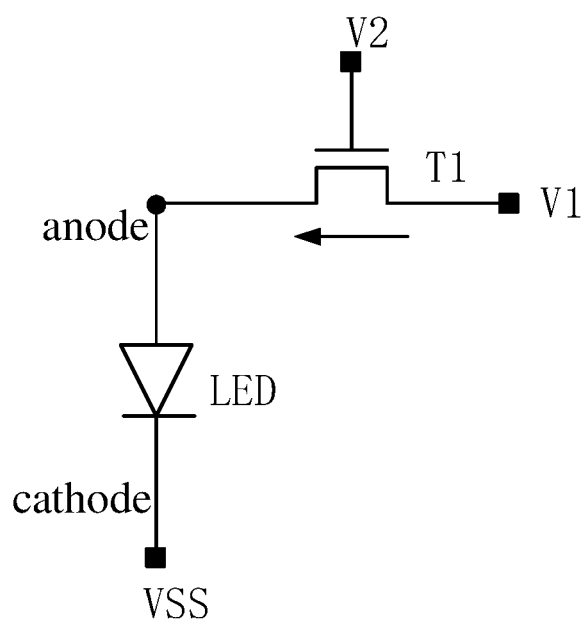

FIGS. 3A and 3B schematically illustrate example operations of the electrostatic protection sub-circuit according to an embodiment of the present disclosure. FIG. 3A shows the first switching element in an off-state and FIG. 3B shows the first switching element in an on-state. As shown in the figures, the first switching element may be implemented as a transistor T1. A gate of the transistor T1 is electrically coupled to the second voltage terminal V2, a source of the transistor T1 is electrically coupled to the anode of the micro LED, and the drain of the transistor T1 is electrically coupled to the first voltage terminal V1. Before the electrostatic protection sub-circuit 12 is used to respond to the electrostatic accumulation to protect the micro-LED, the first voltage V1 and the second voltage V2 are respectively set so that the transistor T1 is in an off-state capable of feeding back the anode voltage of the micro LED.

In some implementations, the first voltage V1 and the second voltage V2 in the light emitting period may be set. For example, in some implementations, a predetermined first threshold voltage may be calculated according to a reverse breakdown threshold voltage of the micro LED, and a predetermined second threshold voltage may be calculated according to a minimum value of the anode voltage when the micro LED normally emits light. For another example, in some implementations, a second voltage greater than or equal to the first threshold voltage and less than or equal to the second threshold voltage may be applied at the second voltage terminal V2. In other implementations, the first voltage may be set to have a value equal to or greater than that of the second voltage. With the above arrangement, the transistor T1 may be in an off-state capable of feeding back the anode voltage of the micro LED, as shown in FIG. 3A. At this time, the micro LED is not affected by the branch where the transistor T1 is located, and can emit light normally under the driving of the pixel driving circuit.

Next, when the charges continue to be accumulated at the anode of the micro LED and reaches the critical state, that is, in a case where, in response to the charges being accumulated at the anode of the micro LED, the voltage of the source of the transistor T1 is lower than the voltage of the gate of the transistor T1 and the difference between the voltage of the gate and the voltage of the source of the transistor T1 reaches the turn-on threshold voltage of the transistor T1, the transistor T1 is turned on, as shown in FIG. 3B.

After the transistor T1 is turned on, the first voltage applied to the drain of the transistor T1 is applied to the anode of the micro LED via the transistor T1, to charge the anode of the micro LED to the first voltage, i.e., resets the anode voltage of the micro LED to the first voltage. After the anode voltage of the micro LED is reset to the first voltage, the transistor T1 is turned off again, as shown in FIG. 3A, the transistor T1 returns to the off state again for waiting for charge accumulation occurring again at the anode of the micro LED, so as to repeat the process. After the transistor T1 is turned off, the branch where the transistor T1 is located or the first voltage does not affect the light emission of the micro LED any longer, and meanwhile, after the transistor T1 is turned off, the micro LED can be rapidly adjusted to return to the normal light emission state under the driving of the pixel driving circuit.

In the light emitting period of the micro LED, the transistor T1 in the off state capable of feeding back the anode voltage of the micro LED will repeatedly perform the above process to eliminate the risk of electrostatic breakdown of the micro LED. Therefore, the electrostatic protection sub-circuit according to the embodiment of the disclosure can adjust the anode voltage of the micro LED to protect the micro LED by appropriately setting the second voltage and the first voltage applied at the gate and the drain of the transistor T1, so that the transistor T1 can be turned on or off according to the charge accumulation at the anode of the micro LED, thereby avoiding the occurrence of electrostatic breakdown and improving the reliability and stability of the display of the micro LED.

In some implementations, the first threshold voltage may be determined according to the following expression (1):

$$V_{T1} = V_{SS} - V_{BR} + V_{th} \quad (1)$$

where $V_{T1}$ represents the first threshold voltage, $V_{SS}$ represents the cathode voltage of the micro-LED (i.e., the voltage of the common voltage terminal VSS), $V_{BR}$ represents the reverse breakdown threshold voltage of the micro-LED, and $V_{th}$ represents the turn-on threshold voltage of the transistor T1.

In some implementations, the second threshold voltage is determined according to the following expression (2):

$$V_{T2} = V_{min} + V_{th} \quad (2)$$

wherein $V_{T2}$ represents the second threshold voltage, $V_{min}$ represents the minimum value of the anode voltage when the micro LED normally emits light, and $V_{th}$ represents the turn-on threshold voltage of the transistor T1.

In addition, it should be noted that, in the protection circuit 10 for protecting the micro LED according to the embodiment of the present disclosure, during the period of bonding the micro LED to the backplane, the second voltage at the low level needs to be applied to the gate of the transistor T1 through the second voltage terminal V2, so that the transistor T1 is kept off when the bonding operation of the micro LED to the backplane is performed.

Figure 4:
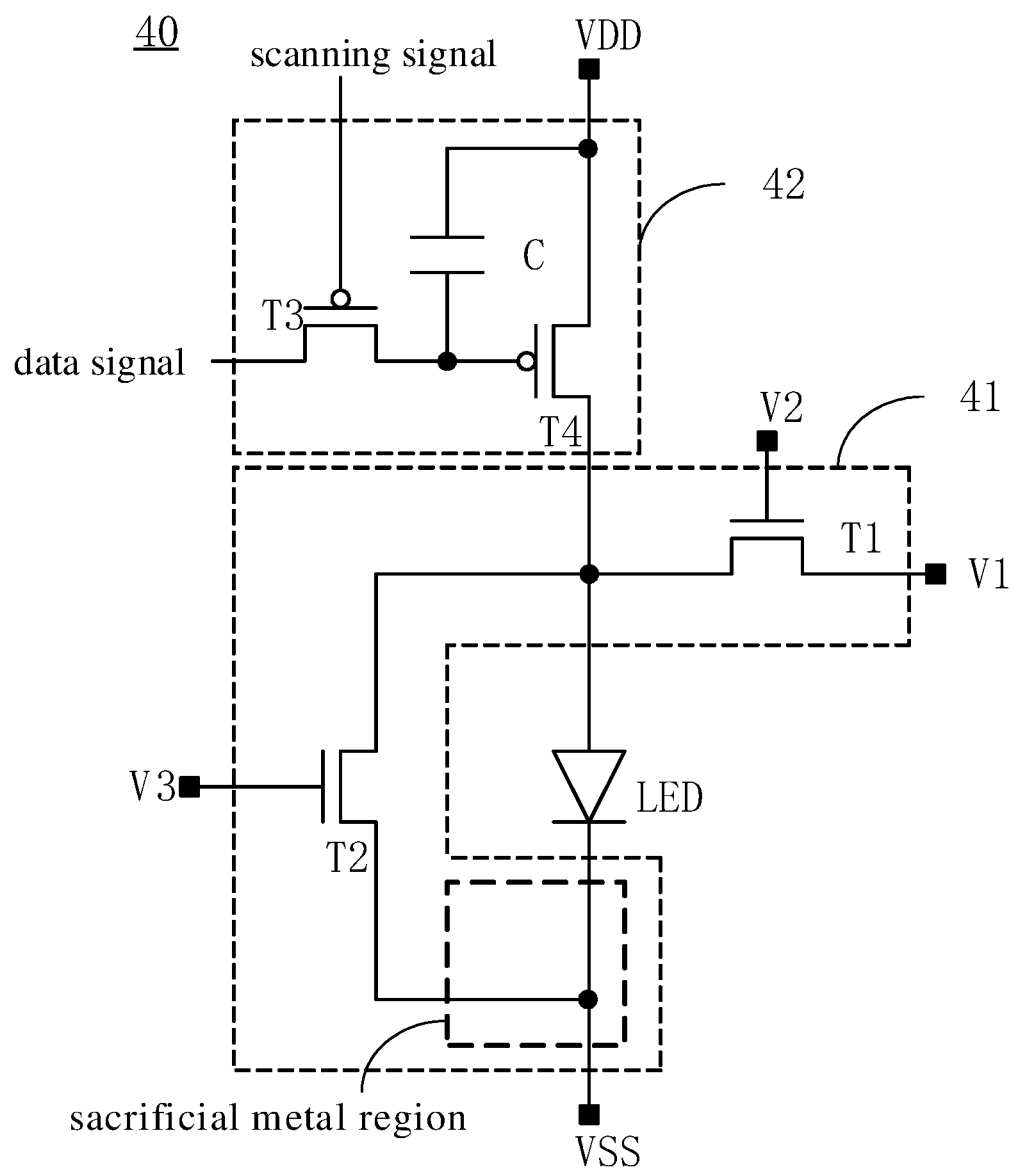
FIG. 4 schematically illustrates a pixel unit according to an embodiment of the disclosure.

FIG. 4 schematically illustrates a pixel unit according to an embodiment of the disclosure. As shown in FIG. 4, a pixel unit 40 according to the embodiment of the present disclosure may include a light emitting element, a protection circuit 41 for protecting the light emitting element, and a pixel driving circuit 42. The protection circuit 41 for protecting the light emitting device may refer to the embodiments described with reference to FIGS. 1 to 3B, and will not be described herein again.

In FIG. 4, the pixel driving circuit 42 is shown as a 2T1C pixel driving circuit. As shown in FIG. 4, the pixel driving circuit 42 includes a switching transistor T3, a driving transistor T4, and a storage capacitor C. In the example of FIG. 4, the switching transistor T3 and the driving transistor T4 are both P-type thin film transistors, but the embodiments of the present disclosure are not limited thereto. When a row of pixel units to which the micro LED belongs is scanned, a scanning signal at a low level is applied to the gate of the switching transistor T3, the switching transistor T3 is turned on, and a data signal is written into the storage capacitor C. When the scanning of the row of pixel units is finished, the scanning signal is changed into being at a high level, so that the switching transistor T3 is turned off, the gate voltage stored in the storage capacitor C drives the driving transistor T4 to generate a current to drive the micro LED, and the micro LED can be ensured to continuously emit light in one frame of display.

It will be understood by those skilled in the art that the protection circuit for protecting the light emitting element provided in the present disclosure may be applied to a pixel driving circuit of any structure, and the 2T1C pixel driving circuit illustrated in FIG. 4 is merely an example, and the present disclosure is not limited thereto.

A pixel unit including the protection circuit according to the embodiments of the present disclosure may have the advantages of the protection circuits described above in different embodiments.

Figure 5:
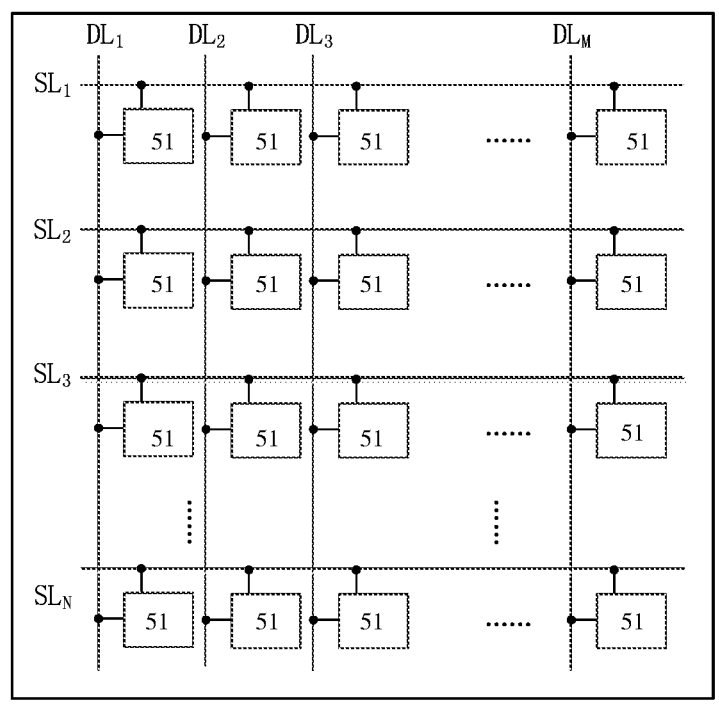
FIG. 5 schematically illustrates a display panel according to an embodiment of the present disclosure.

FIG. 5 schematically illustrates a display panel according to an embodiment of the present disclosure. As shown in FIG. 5, the display panel 50 includes a plurality of pixel units 51 arranged in an array, and each of the pixel units 51 is a pixel unit as shown in FIG. 4. The display panel 50 may further include other circuit structures, for example, the display panel 50 may further include a plurality of data lines $DL_1, DL_2, \ldots, DL_M$ for providing data signals and a plurality of scanning lines $SL_1, SL_2, \ldots, SL_N$ for providing scanning signals, where M and N are natural numbers.

The display panel including the protection circuit according to the embodiments of the present disclosure may have the advantages of the protection circuits described above in different embodiments.

Figure 6:
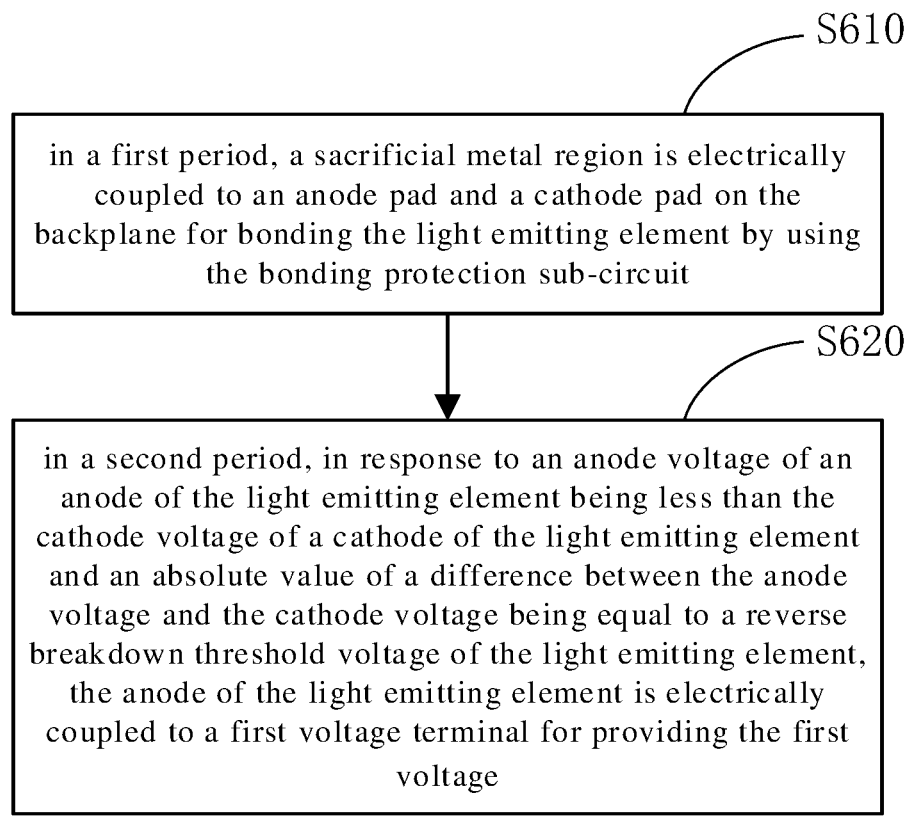
FIG. 6 schematically shows a flow chart of a driving method for driving a protection circuit according to an embodiment of the present disclosure.
Figure 7:
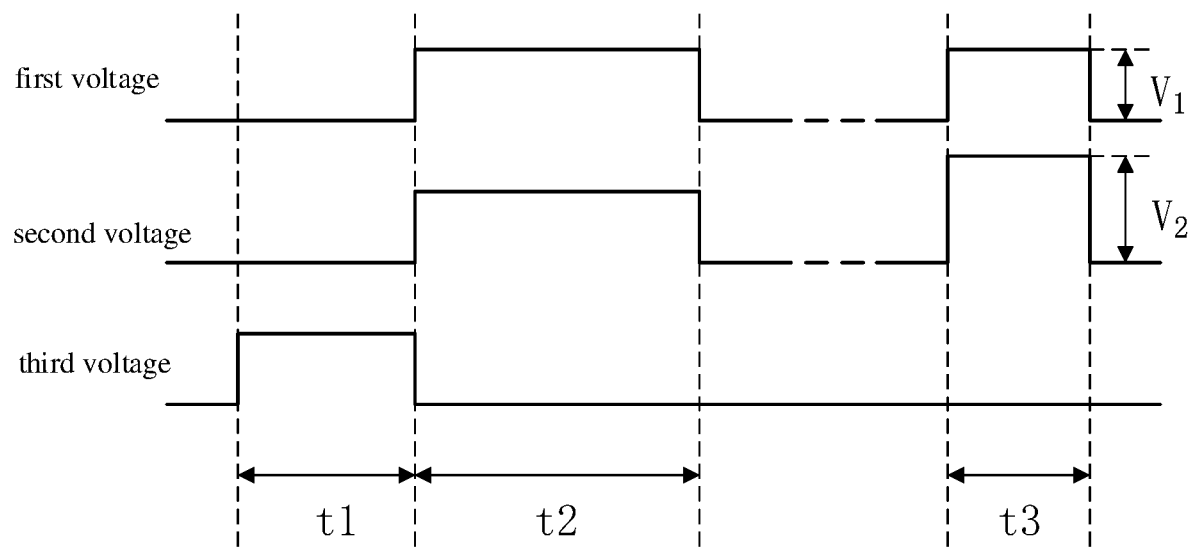
FIG. 7 schematically shows a signal timing diagram of the driving method shown in FIG. 6.

FIG. 6 schematically shows a flow chart of a driving method of a protection circuit for protecting a light emitting element according to an embodiment of the present disclosure, FIG. 7 schematically shows a signal timing chart of the method shown in FIG. 6, and the driving method of the protection circuit for protecting the light emitting element will be described below with reference to FIGS. 6 and 7.

As shown in FIG. 6, the driving method of the protection circuit for protecting the light emitting element according to the embodiment of the present disclosure includes the following steps S610 and S620.

In step S610, in a first period, a sacrificial metal region is electrically coupled to an anode pad and a cathode pad on the backplane for bonding the light emitting element by using the bonding protection sub-circuit.

As shown in FIG. 7, in a first period t1, an operation of bonding the micro LED with the backplane is performed. The third voltage applied to the gate of the transistor T2 (referring to FIG. 2) is at a high level, and the second voltage applied to the gate of the transistor T1 and the first voltage applied to the drain of the transistor T1 (referring to FIGS. 3A and 3B) are both at a low level. At this time, the transistor T2 is turned on, the transistor T1 is turned off, and the sacrificial metal region 111, the anode pad A and the cathode pad B are all electrically coupled to the common voltage terminal VSS, and thus the anode pad A and the cathode pad B can be prevented from being oxidized when the micro LED is bonded to the backplane.

After the first period t1, that is, after the operation of bonding the micro LED with the backplane is completed, a third voltage at a low level is applied to the gate of the transistor T2, so that the transistor T2 is turned off, and the bonded micro LED can normally emit light under the driving of the pixel driving circuit.

In step S620, in a second period, in response to an anode voltage of an anode of the light emitting element being less than the cathode voltage of a cathode of the light emitting element and an absolute value of a difference between the anode voltage and the cathode voltage being equal to a reverse breakdown threshold voltage of the light emitting element, the anode of the light emitting element is electrically coupled to a first voltage terminal for providing the first voltage.

As shown in FIG. 7, in the second period t2, the micro LED may be driven to emit light by the pixel driving circuit. The third voltage applied to the gate of the transistor T2 (referring to FIG. 2) is at a low level, the second voltage applied to the gate of the transistor T1 (referring to FIGS. 3A and 3B) is equal to or greater than a predetermined first threshold voltage $V_{T1}$ and equal to or less than a predetermined second threshold voltage $V_{T2}$, the first voltage applied to the drain of the transistor T1 (referring to FIGS. 3A and 3B) is equal to or greater than a second voltage, and in the example shown in FIG. 7, the first voltage and the second voltage have the same voltage value in the second period t2. At this time, the transistor T2 remains in an off state, and the transistor T1 is in an off state in which the anode voltage of the micro LED can be fed back.

In the second period t2, in response to the anode voltage of the micro LED being less than the cathode voltage of the micro LED and the absolute value of the difference between the anode voltage and the cathode voltage being equal to the reverse breakdown threshold voltage of the micro LED, the transistor T1 configured as described above may be automatically turned on, and the anode of the micro LED is charged with the first voltage, so that the anode voltage of the anode of the micro LED is raised again to the first voltage, thereby preventing the reverse breakdown of the micro LED caused by the accumulation of static electricity.

A value range of the second voltage may be determined by referring to expressions (1) and (2) in the foregoing embodiments, and the value of the first voltage may be equal to or greater than the value of the second voltage.

In other embodiments, the protection circuit for protecting the light emitting element according to the embodiment of the present disclosure may also be used to test the light emitting element to determine whether the light emitting element can emit light normally.

According to an embodiment of the present disclosure, the driving method of the protection circuit for protecting the light emitting element may further include:

in a third period t3, the second switching element is turned off by the third voltage, the first switching element is turned on by the second voltage, and the light emitting element is caused to emit light by the first voltage, so as to test the light emitting element.

As shown in FIG. 7, in the third period t3, the micro LED is tested. The second voltage applied to the gate of the transistor T1 (referring to FIGS. 3A and 3B) is at a high level, the first voltage applied to the drain of the transistor T1 (referring to FIGS. 3A and 3B) is also at a high level, and the voltage value $V_2$ of the second voltage is greater than the voltage value $V_1$ of the first voltage, so that the transistor T1 may be turned on under the control of the second voltage and the first voltage, and the first voltage is applied to the anode of the micro LED to test whether the micro LED can normally emit light.

It should be noted that, as shown in FIG. 7, in order to compare the voltages, the third period t3 for the test is shown after the first period t1 for the bonding and the second period t2 for the normal light emission. It should be understood that the third time period t3 may be located at any position, such as within the first time period t1 or after the first time period t1, or within the second time period t2. That is, the test may be performed during the bonding process, or during the light emission. In addition, it can be understood that, when the test is performed during the bonding process, the test needs to be performed on the already bonded micro LEDs after the second switching element is turned off by the third voltage, even though there are some micro LEDs still unbonded.

Since the bonding operation is generally performed on a general machine, it is difficult to test the micro LEDs after the bonding operation to observe the bonding effect in real time. For the active matrix display panels, signals are complex, and signals required by different driving modes are different, thus a test using a common signal is difficult to be achieved. Therefore, the method for testing the micro LED by using the protection circuit according to the embodiment of the disclosure is particularly suitable for the process of bonding the micro LED with the backplane.

According to the method of the embodiment of the disclosure, through simple configuration of voltages of the protection circuit for protecting the light emitting element, the bonding, the testing and the electrostatic protection in use of the light emitting element are simultaneously realized with a simple structure.

According to the technical solutions of the embodiments of the disclosure, a protection circuit for protecting a light emitting element is provided, where a sacrificial metal region is electrically coupled to an anode pad and a cathode pad on a backplane by using a bonding protection sub-circuit in a period of bonding the light emitting element to the backplane so as to provide an additional oxidation region for bonding operation, thereby relieving or avoiding the problem that the pads are oxidized in the bonding process, improving the coupling between the light emitting element and the backplane, and improving the display performance. Furthermore, by resetting, using the electrostatic protection sub-circuit, the anode voltage of the light emitting element in response to the light emitting element being subjected to electrostatic breakdown in a period of the light emitting element emitting light to protect the light emitting element, occurrence of electrostatic breakdown is prevented, thereby improving reliability and stability of the light emitting element.

It should be noted that in the above description, the technical solutions of the embodiments of the present disclosure are shown by way of example only, and the embodiments of the present disclosure are not meant to be limited to the steps and structures described above. Steps and structures may be modified and substituted as desired where possible. Accordingly, certain steps and elements are not essential elements of implementing the general inventive concepts of the embodiments of the present disclosure.

The disclosure has thus been described with reference to the embodiments. It should be understood that various other changes, substitutions, and additions may be made by those skilled in the art without departing from the spirit and scope of the embodiments of the present disclosure. Therefore, the scope of the embodiments of the present disclosure should not be limited by the particular embodiments described above, but should be defined only in accordance with the following claims.

The invention claimed is:

1. A protection circuit for a light emitting element, comprising:
a bonding protection sub-circuit comprising a sacrificial metal region, the bonding protection sub-circuit being configured to electrically couple the sacrificial metal region to an anode pad and a cathode pad on a backplane for bonding the light emitting element during a period in which the light emitting element is bound to the backplane, and
an electrostatic protection sub-circuit configured to, in a light emission period of the light emitting element, cause an anode of the light emitting element to be electrically coupled to a first voltage terminal supplying a first voltage in response to an anode voltage of the anode of the light emitting element being less than a cathode voltage of a cathode of the light emitting element and an absolute value of a difference between the anode voltage and the cathode voltage being equal to a reverse breakdown threshold voltage of the light emitting element.

2. The protection circuit of claim 1, wherein the electrostatic protection sub-circuit comprises:
a first switch element having a control terminal electrically coupled to a second voltage terminal for providing a second voltage, a first terminal electrically coupled to the anode of the light emitting element, and a second terminal electrically coupled to the first voltage terminal.

3. The protection circuit of claim 2, wherein
in the light emission period, the second voltage is equal to or greater than a first threshold voltage and equal to or less than a second threshold voltage,
the first threshold voltage is determined according to the following expression:

$$V_{T1}=V_{ss}-V_{BR}+V_{th}$$

wherein VT1 represents the first threshold voltage, $V_{ss}$ represents the cathode voltage of the light emitting element, $V_{BR}$ represents a reverse breakdown threshold voltage of the light emitting element, and $V_{th}$ represents a turn-on threshold voltage of the first switching element; and
the second threshold voltage is determined according to the following expression:

$$V_{T2}=V_{min}+V_{th}$$

wherein $V_{T2}$ represents the second threshold voltage, $V_{min}$ represents a minimum value of the anode voltage when the light emitting element normally emits light, and $V_{th}$ represents the turn-on threshold voltage of the first switching element.

4. The protection circuit of claim 1, wherein the sacrificial metal region is electrically coupled to the cathode pad, and the sacrificial metal forming the sacrificial metal region has a greater electron-loss capability than the metal forming the anode pad and the cathode pad.

5. The protection circuit of claim 1, wherein the bonding protection sub-circuit further comprises a second switching element having a control terminal electrically coupled to a third voltage terminal for providing a third voltage, a first terminal electrically coupled to the anode pad, and a second terminal electrically coupled to the cathode pad.

6. The protection circuit of claim 3, wherein the bonding protection sub-circuit further comprises a second switching element having a control terminal electrically coupled to a third voltage terminal for providing a third voltage, a first terminal electrically coupled to the anode pad, and a second terminal electrically coupled to the cathode pad.

7. The protection circuit of claim 6, wherein the first switching element comprises an N-type transistor and the second switching element comprises an N-type transistor.

8. A pixel unit, comprising:
the protection circuit of claim 1;
a light emitting element; and
a pixel driving circuit configured to control a magnitude of a current flowing through the light emitting element based on an input data signal to control a light emission luminance of the light emitting element.

9. A display panel, comprising a plurality of pixel units of claim 8.

10. A driving method of the protection circuit for a light emitting element according to claim 1, comprising:
in a first period, electrically coupling the sacrificial metal region to the anode pad and the cathode pad on the backplane for bonding the light-emitting element by using the bonding protection sub-circuit, and
in a second period, in response to an anode voltage of an anode of the light emitting element being less than a cathode voltage of a cathode of the light emitting element and an absolute value of a difference between the anode voltage and the cathode voltage being equal to a reverse breakdown threshold voltage of the light emitting element, the anode of the light emitting element is electrically coupled to a first voltage terminal for providing a first voltage.

11. The driving method of claim 10, the protection circuit comprising a first switch element having a control terminal electrically coupled to a second voltage terminal for providing a second voltage, a first terminal electrically coupled to the anode of the light emitting element, and a second terminal electrically coupled to the first voltage terminal, wherein the driving method further comprising:
in the second period, a second voltage is set to be equal to or greater than a first threshold voltage and equal to or less than a second threshold voltage, and the first voltage is set to be equal to or greater than the second voltage.

12. The driving method of claim 11, wherein,
the first threshold voltage is determined according to the following expression:

$$V_{T1}=V_{ss}-V_{BR}+V_{th}$$

wherein $V_{T1}$ represents the first threshold voltage, $V_{ss}$ represents the cathode voltage of the light emitting element, $V_{BR}$ represents a reverse breakdown threshold voltage of the light emitting element, and $V_{th}$ represents a turn-on threshold voltage of the first switching element; and
the second threshold voltage is determined according to the expression:

$$V_{T2}=V_{min}+V_{th}$$

wherein $V_{T2}$ represents the second threshold voltage, $V_{min}$ represents a minimum value of the anode voltage when the light emitting element normally emits light, and $V_{th}$ represents the turn-on threshold voltage of the first switching element.

13. The driving method of claim 10, the bonding protection sub-circuit further comprises a second switching element having a control terminal electrically coupled to a third voltage terminal for providing a third voltage, a first terminal electrically coupled to the anode pad, and a second terminal electrically coupled to the cathode pad, wherein the driving method further comprising:
   turning on, in the first period, the second switching element by the third voltage.

14. The driving method of claim 13, further comprising:
   turning off, after the first period, the second switching element by the third voltage.

15. The driving method of claim 10, the protection circuit comprises a first switch element having a control terminal electrically coupled to a second voltage terminal for providing a second voltage, a first terminal electrically coupled to the anode of the light emitting element, and a second terminal electrically coupled to the first voltage terminal, and the bonding protection sub-circuit further comprises a second switching element having a control terminal electrically coupled to a third voltage terminal for providing a third voltage, a first terminal electrically coupled to the anode pad, and a second terminal electrically coupled to the cathode pad, wherein the driving method further comprising:
   in a third period, turning off the second switching element by the third voltage, turning on the first switching element by the second voltage, and causing the light emitting element to emit light by the first voltage to test the light emitting element.

\* \* \* \* \*